United States Patent [19]

Rizzello

[11] 4,389,718
[45] * Jun. 21, 1983

[54] PHONOGRAPH DECOUPLING APPARATUS AND METHOD

[76] Inventor: Frank Rizzello, 85-50 259th St., Floral Park, N.Y. 11004

[*] Notice: The portion of the term of this patent subsequent to Oct. 27, 1998, has been disclaimed.

[21] Appl. No.: 244,305

[22] Filed: Mar. 16, 1981

Related U.S. Application Data

[63] Continuation of Ser. No. 86,997, Oct. 22, 1979, Pat. No. 4,279,423.

[51] Int. Cl.³ ............................................. G11B 3/60
[52] U.S. Cl. ................................. 369/247; 369/263; 369/264
[58] Field of Search ............... 369/247, 263, 266, 270, 369/271, 269, 264, 265, 258

[56] References Cited

U.S. PATENT DOCUMENTS

| | | | |
|---|---|---|---|
| 1,388,980 | 8/1921 | Talarico | 274/23 R |
| 1,847,181 | 3/1932 | Harrison | 274/39 A X |
| 1,917,633 | 7/1933 | Burt | 274/39 A |
| 2,331,122 | 10/1943 | Jones | 274/23 X |
| 2,814,494 | 11/1957 | Wennerbo | 274/9 R |
| 2,978,281 | 4/1961 | Hayward | 274/39 R |
| 3,025,066 | 3/1962 | Siebert | 274/39 R |
| 3,048,408 | 8/1962 | Morgan | 274/39 R |
| 3,082,635 | 3/1963 | Grado | 274/39 R X |
| 3,309,094 | 3/1967 | Stanton | 274/39 R |
| 3,510,137 | 5/1970 | Freier | 274/39 A |
| 3,720,415 | 3/1973 | Daniels et al. | 274/39 R |
| 3,815,146 | 6/1974 | Nash | 274/39 R X |
| 3,870,321 | 3/1975 | Smith | 274/39 R |
| 4,071,252 | 1/1978 | Gillespie | 274/39 R |
| 4,098,513 | 7/1978 | Klapproth | 274/39 A |

FOREIGN PATENT DOCUMENTS

| | | | |
|---|---|---|---|
| 703177 | 2/1931 | France | 274/39 A |
| 1320894 | 6/1973 | United Kingdom | 274/39 A |

OTHER PUBLICATIONS

"More Than Just a Load of Balls", by Johnathan Mills.

*Primary Examiner*—Harry N. Haroian
*Attorney, Agent, or Firm*—Frishauf, Holtz, Goodman & Woodward

[57] ABSTRACT

A record playing apparatus has a plurality of small area contact mounting devices distributed around confronting surfaces of a lower and upper turntable platter, the lower turntable platter being motor driven. The small contact area mounting devices comprise elongated members comprising substantially "point contact" at at least one end thereof. The small contact area mounting devices can be used to mount the base to a sub-base and/or the tone arm arrangement to the base of the record player.

44 Claims, 14 Drawing Figures

PHONOGRAPH DECOUPLING APPARATUS AND METHOD

This is a continuation of application Ser. No. 86,997 filed Oct. 22, 1979 now U.S. Pat. No. 4,279,423.

BACKGROUND OF THE INVENTION

This invention relates to phonograph apparatus and method, and more particularly to an apparatus and method for decoupling a phonograph record in order to prevent pick-up of noise generated in the various mechanisms associated with a phonograph record playing device.

The purpose of the present invention is to provide a method and means whereby a playing phonograph record may be much better isolated from its environment and thereby unburden the entire playback system from having to reproduce those environmental acoustic disturbances normally picked up by the cartridge in conventional record players.

The acoustic disturbances that this invention greatly reduces are those transmitted:
 (a) to the base structure (structure born and airborne feedback;
 (b) to the turntable playing surface or platter (structure born and airborne feedback and also motor rumble and main bearing rumble); and
 (c) to the tone arm (same as in b above).

The above objects are achieved while still maintaining a substantially rigid and substantially non-compliant relationship between the tone arm and record playing surface (a turntable platter) and at the same time providing a means to support and/or damp the record (same turntable platter). A record damping mat is usually interposed between the record and platter and also serves to damp the platter as well as the record.

SUMMARY OF THE INVENTION

In accordance with the present invention, a record playing apparatus comprises a first motor driven turntable platter and a second turntable platter mounted above said motor driven platter, the second platter preferably having a spindle in the central portion thereof for engagement through the center opening of a phonograph record, the second platter being mounted to the first motor driven platter by means of a plurality of small contact area mounting devices distributed around the confronting surfaces of the first and second platters. Preferably, three or more small area mounting devices are provided between the first motor driven platter and the second platter.

In a preferred arrangement, the small contact area mounting devices comprise a plurality of protrusions or projections, such as pins, having pointed ends extending downwardly from the second platter. The first motor driven platter preferably has a groove(s) or receptacles for receiving the pointed ends of the protrusions or projections, whereby the second platter is mounted above the first platter. Instead of protrusions with pointed ends, elongated thin rods could be used.

In accordance with a further feature of the invention, the above type of mounting technique is used for the tone arm mechanism and/or for the base member on which the overall phonograph mechanism is mounted.

Various modifications may be made as discussed in the Detailed Description hereinbelow.

DETAILED DESCRIPTION

Figures 1, 2, 2A, 3, 3A, 4, 10:
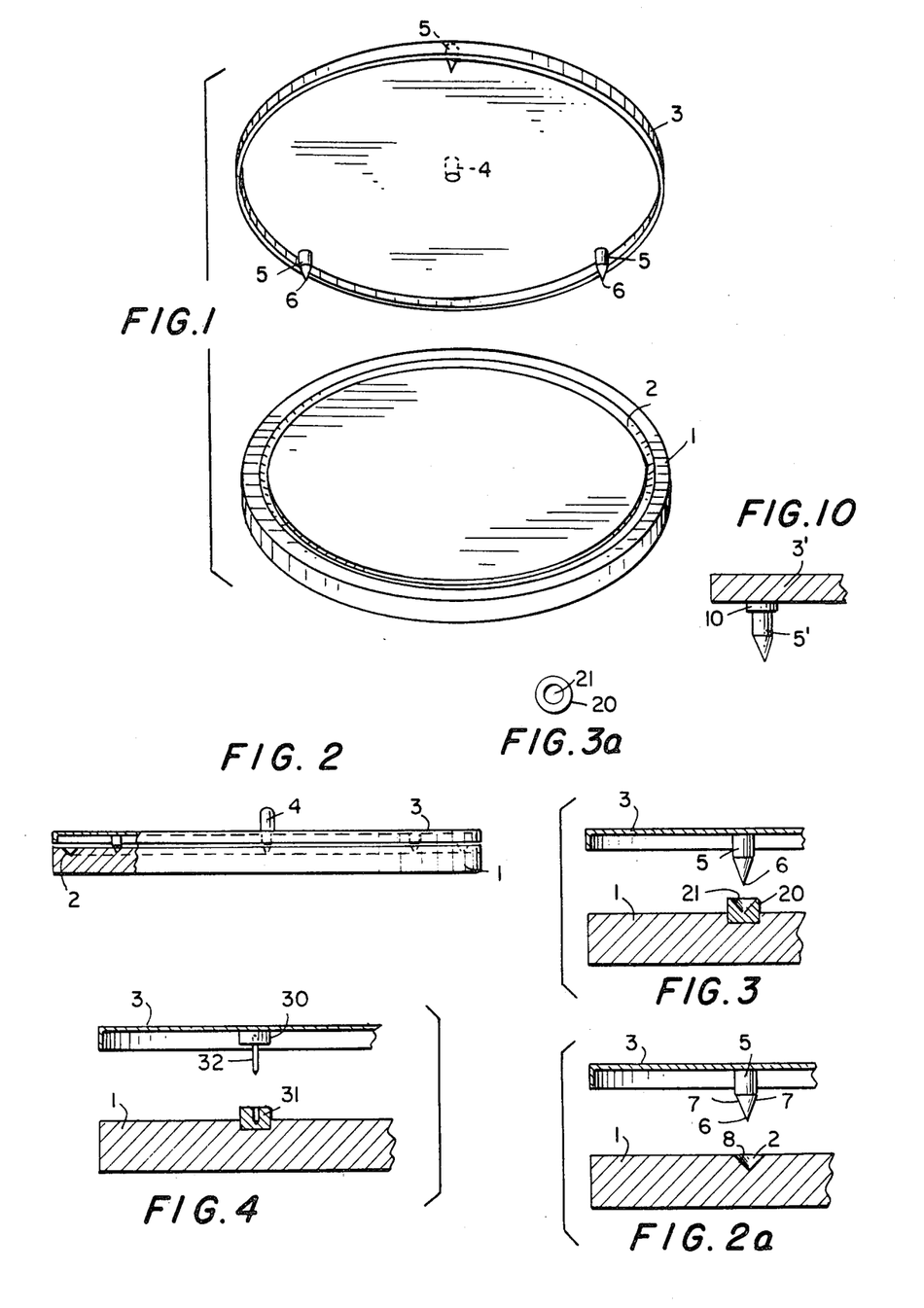
FIG. 1 is a perspective view of lower and upper turntables in a disassembled state.
FIG. 2 is a part sectional side view of the upper and lower turntables mounted to each other.
FIG. 2A is an exploded view of the mounting pin arrangement of FIG. 2.
FIG. 3 is an exploded detail showing an alternate mounting pin arrangement.
FIG. 3a is a top view of the receptacles 20.
FIG. 4 is an exploded detail showing yet another alternate mounting arrangement.
FIG. 10 is a fragmentary view of a modified arrangement of the present invention.

FIG. 1 illustrates a lower turntable platter 1 which is motor driven. The motor drive for the turntable platter 1 is not shown, but may comprise a direct drive, belt drive, etc., or any other conventional or known drive arrangements. The lower turntable platter 1 has a generally V-shaped groove 2 extending around a peripheral portion of the upper surface thereof. An upper turntable platter 3 having a spindle 4 extending upwardly from the central portion thereof is mounted over the lower platter 1 by means of three downwardly extending elongated pins 5. The pins 5 have pointed tips 6 which are adapted to be received in the groove 2. Preferably, in order to provide a minimum contact area between the pins 5 and groove 2, the side walls 7 of the pins 6 are more sharply sloped upwardly than the side walls 8 of the groove 2. This is more clearly seen from FIG. 2a. The purpose of the more sharply upwardly sloped side walls 7 is to provide a substantial point contact of the pin 5 in the bottom of the groove 2. It has been found that the smaller the contact area, the better the decoupling.

The V-shaped groove 2 may be segments of an arc instead of circular as shown in FIG. 1. The groove 2 may also comprise straight segments in registration with associated pins 5. The circular arrangement of FIG. 1 has the advantage that the platter 3 may be rotated relative to platter 1 to obtain optimal balancing.

Any number of pins 5, or the like, may be provided. However, it has been found to be preferable to have as few pins 5 as possible. Three pins 5 have been found to provide satisfactory results.

In order to further provide excellent decoupling of the phonograph record from acoustic feedback, airborne feedback, turntable motor rumble and main bearing rumble, it is further preferable to provide a spindle 4 on the upper platter 3, rather than on the lower platter 1. It has been found that if the spindle 4 extends from the lower platter 1, the decoupling effect is reduced.

The above described embodiment involves the use of pins 5 extending downwardly into a groove 2 of the lower platter 1. However, the arrangement could be reversed by providing pins 5 extending upwardly from lower platter 1 and into a groove such as groove 2 formed in the confronting surface of the upper platter 3.

While it is preferred to have as small a contact area as possible coupling the upper and lower platters together, it is preferred that the contact areas cover less than 25% of the area of the lower round turntable platter. As mentioned above, while it is preferred that the spindle 4 extend from the upper turntable platter rather than from the lower platter, the invention contemplates the possibility that the spindle could extend from the lower platter 1. In this case, the upper platter 3 has a hole in the central portion thereof to permit the spindle extending from the lower platter to extend therethrough.

While the upper and lower platters are shown in FIGS. 1 and 2 as being removable relative to each other, it is possible to permanently or fixedly connect them at the point contact areas. The upper and lower turntable platters are made of a substantially rigid material preferably inherently having good damping characteristics, such as wood or some metals.

The system of FIGS. 1 and 2 can also include some small compliances, such as hard rubber layers, as shown in the fragmentary view of FIG. 10. Referring to FIG. 10, an upper platter 3' of slightly different configuration than the platter 3 of FIG. 1 has a hard rubber disc 10 secured to the underside thereof, a metal or other rigid pin 5' being secured to the lower surface of the hard rubber disc 10. The pin 5', hard rubber disc 10 and platter 3' can be secured together at the various confronting surfaces by, for example, a suitable adhesive. Except for the provision of the hard rubber disc 10, the arrangement of FIG. 10 is similar to that of FIGS. 1 and 2. The pin 5' engages a groove, such as V-shaped groove 2 in a lower platter 1. A plurality of pins 5' are spaced around the platters, as in FIG. 1. Preferably three pins 5' are used. The hard rubber disc 10 preferably has a very low compliance. While the arrangement of FIG. 10 is suitable in many cases, the provision of the hard rubber disc 10 is not as preferred as the arrangement of FIGS. 1 and 2 wherein the hard rubber disc 10 is not provided. While disc 10 is described as being made of hard rubber, other materials having similar characteristics may be used.

Figures 5, 11, 12:
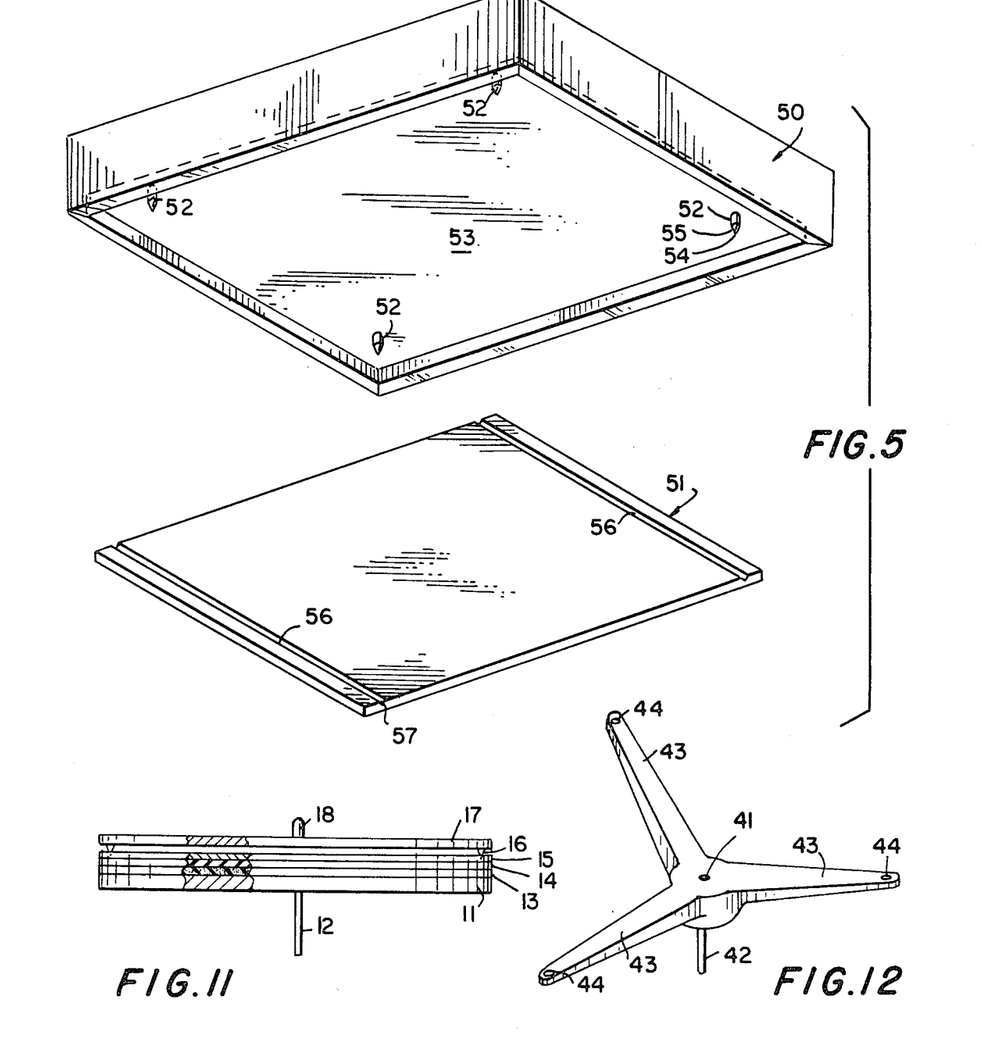
FIG. 5 is a perspective view of a turntable base mounted to a sub-base member in its disassembled state.
FIG. 11 illustrates a further modification of the present invention.
FIG. 12 illustrates yet another embodiment of the invention.

As shown in FIG. 11, a modified arrangement comprises a lower turntable platter 11, preferably made of a substantially rigid metal and driven, for example by means of a motor connected to shaft 12. Platter 11 may alternatively be belt-driven. A foam or other resilient layer 13 is provided on the lower turntable 11 and a hard rubber layer 14 is preferably provided on the foam layer 13. An upper substantially rigid metal layer 15 is provided on hard rubber layer 14. The metal layer 15 may have a smooth upper surface for receiving mounting pins 16 which extend downwardly from the upper turntable platter 17 or may have grooves such as grooves 2 of FIGS. 1 and 2. The upper turntable platter 17 has a spindle 18 extending from the center thereof, the spindle 18 not being coupled to the lower platter 11. The pins 16 are similar to pins 5 of FIG. 1, or they may be mounted by means of a hard rubber layer 10 having a very low compliance as shown in FIG. 10. It is preferred, however, in critical applications, not to use the hard rubber disc 10 of FIG. 10.

The various layers of material on the lower turntable platter shown in FIG. 11 may be connected together by means of, for example, an adhesive, or the layers may be merely superposed one on the other and retained in place by, for example, a central extension of shaft 12 extending through the center of the layers 11–15, but not contacting the upper turntable platter 17. The metal layer 15 may have a V-shaped groove or grooves for receiving the pointed ends of pins 16, similar to groove 2 of FIGS. 1 and 2, or receptacles as shown in FIGS. 3 and 4 (discussed hereinbelow).

The pins 5, 5' illustrated in FIGS. 1, 2, 10 and 11 are preferably made of a hard metal, carbon fiber material, or other similar materials. The pins are preferably made of a rigid or substantially rigid material.

FIG. 3 illustrates a modified arrangement wherein instead of groove 2, the lower turntable platter 1 has receptacles 20 having a generally conically-shaped upper opening 21 therein for receiving the pins 5 which are attached to the upper turntable platter 3. The receptacles 20 are shown in top view in FIG. 3a. The operation and theory of the arrangement of FIG. 3 is substantially identical to that of FIGS. 1 and 2. The receptacles 20 are mounted in blind bores in lower turntable platter 1 and may be either press-fit in the bores, or may be connected by means of an adhesive. While the mounting receptacles 20 are shown to have a round outer periphery, they may be any desired shape, such as square, rectangular, etc. The inclination of the walls of the conical hole 21 is preferably greater than the inclination of the side walls of the pointed end 6 of the pin 5 so that the tip of the pin 5 presents a substantially point contact in the bottom of the conical opening 21, the side walls of the pointed end 6 preferably not contacting the side walls of the conical opening 21. The receptacles 20 may be surface mounted on lower platter 21, thereby eliminating the necessity of the blind bore shown in FIG. 3. Moreover, the pins 5 may extend upwardly from the lower platter 1 and engage receptacles 20, or the like, which are on the confronting underside surface of the upper platter 3.

The arrangement of FIG. 3 may be modified as shown in FIG. 10, and/or as shown in FIG. 11 (receptacles 20 located on metal layer 15), as should be apparent.

FIG. 4 illustrates a further modified arrangement wherein the upper turntable platter 3 has receptacles 30 attached thereto, and the lower turntable platter 1 has receptacles 31 attached thereto. Extending between the receptacles 30, 31 are respective very thin rods 32 which are mounted in bores in respective receptacles 30, 31. While FIG. 4 illustrates only one such rod-type mounting arrangement, it should be clear that at least three are preferably provided distributed around the periphery of the turntable platters 1,3. Compliances could be added to the system of FIG. 4, similar to the arrangements of FIGS. 10 and 11. However, the compliances should be kept as low as possible, and as close in characteristics to a non-compliant system as possible. A non-compliant system, of course, is preferred. The receptacles 30 may be secured to the undersurface of the upper turntable platter 3 by means of an adhesive or other securing means, or may be embedded in bores in upper platter 3 similar to the manner in which receptacles 31 are received in bores in lower platter 1. The thin rods 32 are preferably made of a substantially rigid metal material, carbon fiber material, or other suitable materials.

The preferably metal rods 32 and associated receptacles 30, 31 may be formed in one piece, the rod 32 portion being turned down, for example, on a lathe. The larger ends 30,31 may be attached to the platters as described above. Alternatively, the rods 32 may be inserted directly into bores in the platters and the enlarged receptacles may be eliminated.

FIG. 12 illustrates a further modified arrangement wherein the lower turntable platter 1 is replaced by a spoke-like member 41 having a drive shaft 42 which may be, for example, motor driven. The spokes 43 may have conical openings 44 drilled at the remote end portions thereof, grooves formed in the remote end portions (similar to groove 2 of FIG. 1), or may have receptacles, such as receptacle 20 of FIG. 3, mounted at the end portions thereof for receiving associated pins 5 illustrated in the embodiments of FIGS. 1 and 2. Alternatively, the arrangement may be fabricated with mounting pins 32 and associated receptacles 30,31 as described above with respect to FIG. 4. Very low compliances can be added, for example as shown in FIG. 10. Compliances, however, are not preferred.

Figure 6:
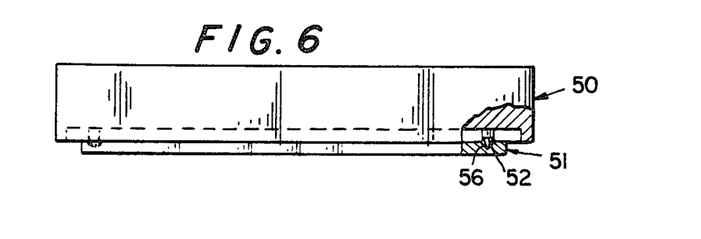
FIG. 6 is a side view of the arrangement of FIG. 5 in its assembled state, shown in partial cross-section to show one mounting pin.

FIGS. 5 and 6 illustrate a further embodiment of the invention wherein the base 50 of a turntable or record player is mounted to a lower mounting member 51 by means of pin-groove arrangements similar to those discussed hereinabove. Base 50, in the embodiment illustrated in FIG. 5, has four pins 52 extending downwardly from a lower surface member 53 thereof. The lower surface member 53 is shown recessed in the base, but it may be flush with the bottom of the base 50, as desired. Pins 52 have pointed tip 54 and sloping walls 55 which form a conical end, similar to the pins illustrated in FIGS. 1 and 2. Lower base member 51 has grooves 56 formed therein for receiving the pointed ends of pins 52. The side walls 57 of the grooves 56 slope outwardly to a greater extent than do the side walls 55 of pins 52 so that the pointed ends 54 of pins 52 make substantially point contact in the bottoms of the grooves 56. The pins 52 are preferably of the same type of construction as mentioned hereinabove—that is, they are made of substantially rigid material, such as substantially rigid metal. More than four pins may be provided, and the pins may be provided in different arrangements than illustrated in FIGS. 5 and 6. Moreover, instead of grooves 56, receptacles such as shown in FIGS. 3 and 4 may be used. Still further, the grooves 56 need not extend along the complete width of lower base member 51—they may be segments, if desired. The grooves 56 may extend lengthwise of the lower base member 51, either with or without the widthwise grooves 56 shown in FIG. 5. Small compliances can be added, for example as shown in FIGS. 10 and 11, but the apparatus provides best effect if substantially no compliances are included.

Instead of pins 52, elongated rod structures such as rods 32 and associated receptacles 30,31 shown in FIG. 4 may be used. The elongated rods, such as rods 32, may be removably installed in receptacles, or permanently connected between the lower base member 51 and the upper base member 50.

Figures 7, 8:
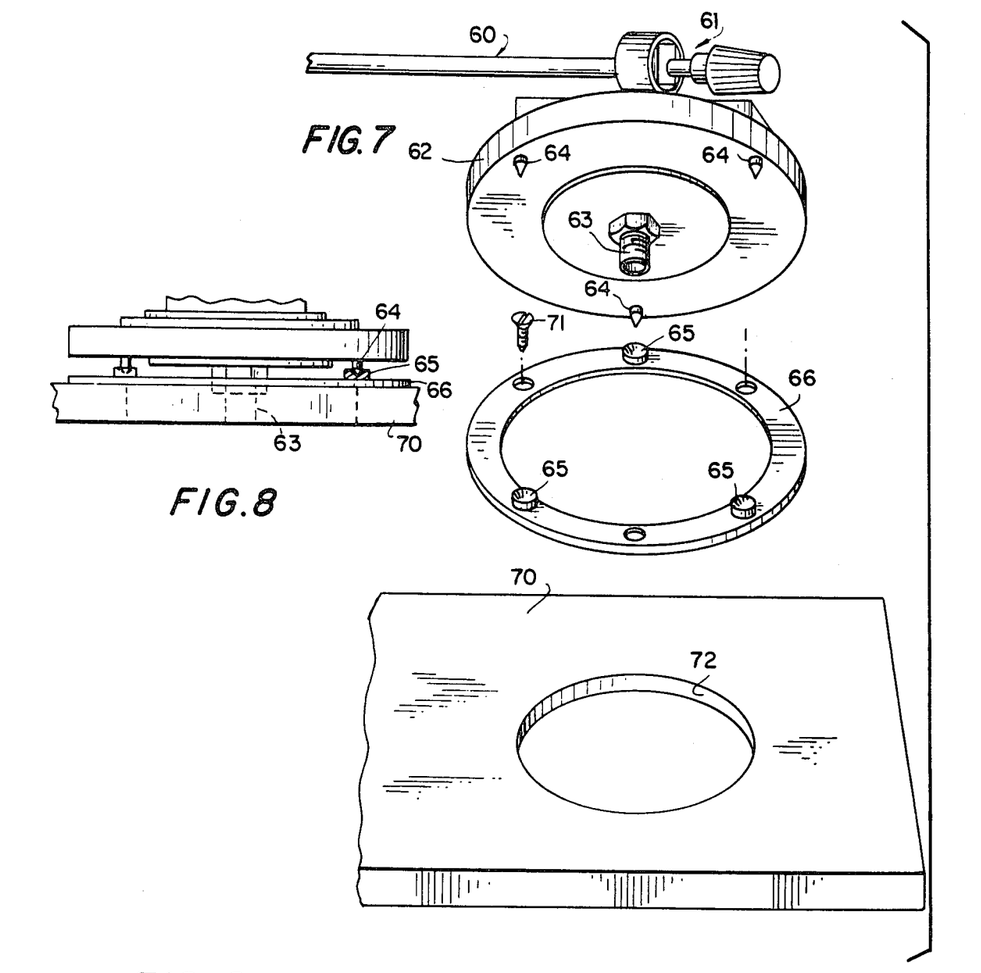
FIG. 7 is a perspective view of a tone arm mounting arrangement in its disassembled state.
FIG. 8 is a side view of the arrangement of FIG. 7 in its assembled state.
Figure 9:
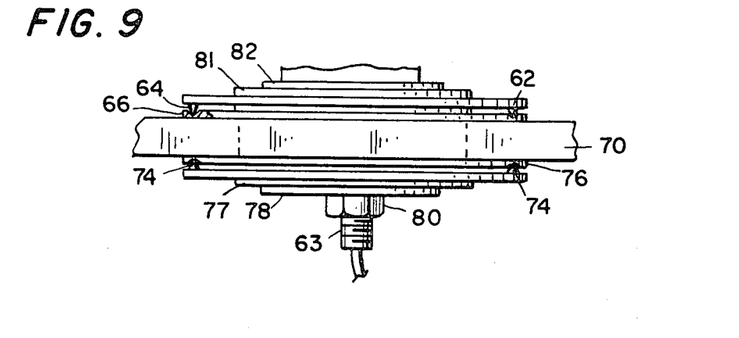
FIG. 9 is a side view of a modified tone arm mounting arrangement

FIGS. 7-9 illustrate still further embodiments of the invention wherein the inventive concept is used for mounting of a tone arm structure to the turntable or record player arrangement. The tone arm structure illustrated in FIGS. 7-9 is generally mounted in the vicinity of a corner of a phonograph base member 50 so that the tone arm extends over the record supporting platter. The mounting location of the tone arm support structure of the present invention relative to the record supporting platter is conventional and is therefore not specifically illustrated in the drawings. With respect to the mounting location of the tone arm support structure relative to the platter, reference is made, for example, to U.S. Pat. Nos. 3,025,066 and 3,309,094.

As illustrated in FIG. 7, a tone arm 60 is mounted in a pivoting structure 61, for example a gimbal-type structure or any other conventional mounting structure, and is in turn mounted to a tone arm base member 62 which is mounted to the upper support surface 70 (FIG. 8) of a turntable base, such as base 50 of FIGS. 5 and 6. The tone arm support arrangement is mounted to the tone arm support member 62 by means of, for example, a hollow bolt 63 through which lead wires from a cartridge at the end of the tone arm 60 pass for connection to an amplifier, or the like. Typical lead wires are shown, for example, in FIG. 9 passing through the hollow bolt 63. The tone arm support member 62 has three pins extending downwardly therefrom, said pins being generally similar in construction to pins 5 illustrated in FIGS. 1 and 2. The pins 64 are arranged to be received in receptacle members 65 mounted on an intermediate ring member 66 which in turn is secured to the upper support surface 70 of the base member 50, for example by means of screws 71. The ring 66 is preferably made of substantially rigid metal, as is the tone arm support member 62. As in the FIGS. 1 and 2 embodiment, the pins 64 are preferably thin and made of substantially rigid material and the conical surfaces of the pins 64 are sloped upwardly to a greater degree than the conical surfaces of the receptacles 65 so that the pins 64 make substantially point contact in the bottom pointed receiving surface of the receptacles 65. The upper support member 70 of the base 50 has an opening 72 through which the hollow bolt 63 and lead wires may pass with clearance.

The tone arm support member 62 may merely rest on the receptacles 65, as shown in FIG. 8, or it may be bolted to the support member 70 of base 50 from below, in a manner similar to that shown in FIG. 9.

The pins 64 may be provided in a different number than as illustrated in FIGS. 7-9. Also, the pins 64 may be replaced by, for example, support members shown in FIG. 4, and if desired, very low compliances can be added, as shown for example in FIG. 10. Preferably, compliances are not added.

FIG. 9 shows a similar arrangement, but with an additional pin-supported mounting plate located below the upper support surface 70 of the base. In the FIG. 9 arrangement, a ring 76, similar to ring 66 of FIG. 7, is secured to the support surface 70. Screws similar to screws 71 may be used, or a single nut and bolt may be used to commonly connect the upper and lower rings 66,76 to the base 70. In the embodiment shown in FIG. 9, the receptacles 65 are not used. Depressions or receiving conical surfaces are formed directly in the rings 66,76 for receiving the pins 64,74 with substantially point-contact at the bottoms of the receiving conical openings. In this embodiment, washer-like members 77,78 are located over the opening in the center of the lower pin-holding member 79 to cooperate with a nut 80 which threadably engages bolt 63. Similar washer-like members 81,82 are provided, as required, for the purpose of mounting the tone arm arrangement to the support member 62. In has been found that even by bolting the moutning device together as shown in FIG. 9, excellent results are achieved. As in FIGS. 7 and 8, the pins 64 may be replaced with mounting arrangements such as those shown in FIG. 4. Also, compliances such as in FIG. 10 can be added, but are not preferable.

As mentioned above, any type of tone arm arrangement may be mounted to support member 62. Typical tone arms are shown, for example, in U.S. Pat. Nos. 3,025,066 and 3,309,094.

The platter mounting arrangement illustrated in FIGS. 1–4 and 10–12 can be used alone, or can be used in combination with one or both of the base mounting arrangement of FIGS. 5 and 6 and/or the tone arm mounting arrangement of FIGS. 7–9. Likewise, the base mounting structure of FIGS. 5 and 6 can be used alone or in combination with any of the other structures, as can the tone arm mounting arrangement of FIGS. 7–9.

While the invention has been described above with respect to specific apparatus, it should be clear that various alterations and modifications can be made within the scope of the invention as set forth in the appended claims.

I claim:

1. A record playing apparatus comprising:
   a first motor driven, substantially rigid, turntable platter;
   a second substantially rigid turntable platter mounted above said motor driven platter with no further platters mounted therebetween, said first and second platters having confronting surface portions, said second platter adapted to receive a record thereon;
   a plurality of low compliance small contact area mounting devices, each of said mounting devices comprising a substantially rigid, substantially inelastic protrusion or projection immovably fixed to and rigidly extending from one of said first and second platters toward the other of said platters and each protrusion or projection having a free end portion of given shape;
   receiving means on said other of said platters, said receiving means comprising at least one depression for receiving and contacting at at least two substantially opposed points said free end portions of said small contact area mounting devices such that movement of said other platter relative to said free end portions of said small contact area mounting devices is substantially prevented in all directions in parallel with the planes of said platters during operation of the record playing apparatus;
   said small contact area mounting devices being spaced from each other and being unconnected with each other, and being distributed around peripheral portions of said confronting surface portions of said first and second platters for providing a plurality of isolated small contact, substantially rigid, support areas directly between said first and second platters and maintaining said confronting surfaces spaced from each other, the total of the cross sectional areas of said small contact area mounting devices being substantially less than the area of said platters in the plane of said platters, said first and second platters being connected with each other only via said small contact area mounting devices; and
   a spindle in the central portion of said second platter for engaging a center of a phonograph record, said spindle not extending to said first platter.

2. Record playing apparatus according to claim 1 wherein said at least one depression has a generally V-shaped cross section.

3. Record playing apparatus according to claim 1 wherein said protrusions or projections extend downwardly from said second platter and said first platter has said receiving means for receiving said protrusions or projections.

4. Record playing apparatus according to claim 1 wherein said receiving means comprises at least one groove for receiving and contacting substantially only the free ends of said protrusions or projections.

5. Record playing apparatus according to claim 1 wherein said receiving means comprises a plurality of receptacles distributed around said other platter for receiving and contacting substantially only the free ends of said protrusions or projections.

6. Record playing apparatus according to claim 1 or 2 wherein said small contact area mounting devices each comprises an elongated, rigid, generally rod-shaped member extending between said confronting surfaces of said first and second platters.

7. A record playing apparatus comprising:
   a substantially rigid base;
   a motor driven turntable platter on said base;
   a tone arm arrangement; and
   a tone arm arrangement mounting structure, said mounting structure comprising:
   a substantially rigid tone arm mounting plate-like member mounted to said base with no members substantially co-extensive with said plate-like member mounted therebetween, said substantially rigid plate-like member and said base having confronting surface portions;
   a plurality of low compliance small contact area mounting devices, each of said mounting devices comprising a substantially rigid, substantially inelastic protrusion or projection immovably fixed to and rigidly extending from one of said base and plate-like member toward the other of said base and plate-like member, each protrusion or projection having a free end portion of given shape; and
   receiving means on said other of said base and plate-like member, said receiving means comprising at least one depression for receiving and contacting at at least two substantially opposed points said free end portion of each of said small contact area mounting devices such that movement of said other of said base and plate-like member relative to said free end portions of said small contact area mounting devices is substantially prevented in all directions in parallel with the planes of said base and plate-like member during operation of the record playing apparatus;
   said small contact area mounting devices being spaced from each other and being unconnected with each other, and being distributed around peripheral portions of said confronting surface portions of said base and plate-like member for providing a plurality of isolated small contact, substantially rigid, support areas directly between said base and plate-like member and maintaining said confronting surfaces spaced from each other, the total of the cross sectional areas of said small contact area mounting devices being substantially less than the area of said confronting surfaces in the plane of said confronting surfaces, said base and plate-like members being connected with each other only via said small contact area mounting devices.

8. Record playing apparatus according to claim 7 wherein said plate-like member is mounted above said base, and further comprising:
a second plate-like member having an upper surface portion which confronts a lower surface portion of said base; and
a further plurality of said substantially rigid small contact area mounting devices and associated receiving means distributed around peripheral portions of said confronting surface portions of said plate-like member and base and providing a plurality of said small contact support areas directly between said second plate-like member and base for maintaining said confronting surface portions of said second plate-like member and said base spaced from each other and substantially preventing relative movement between said second plate-like member and the free end portions of said small contact area mounting devices which contact said second plate-like member.

9. Record playing apparatus according to claim 7 or 8 wherein said at least one depression has a generally V-shaped cross section.

10. Record playing apparatus according to claim 7 or 8 wherein said protrusions or projections extend from a plate-like member, and wherein said base comprises said receiving means thereon.

11. Record playing apparatus according to claim 7 or 8 wherein said receiving means comprises at least one groove for receiving and contacting substantially only the free ends of said protrusions or projections.

12. Record playing apparatus according to claim 7 wherein said receiving means comprises a plurality of receptacles distributed around said other of said confronting surfaces for receiving and contacting substantially only the free ends of said protrusions or projections.

13. Record playing apparatus according to claim 7 or 8 wherein said small contact area mounting devices each comprises an elongated, rigid, generally rod-shaped member extending between said associated confronting surfaces.

14. A record playing apparatus comprising:
a first motor driven, substantially rigid, turntable platter;
a second substantially rigid turntable platter mounted above said motor driven platter with no further platters mounted therebetween, said first and second platters having confronting surface portions, said second platter adapted to receive a record thereon;
a plurality of low compliance small contact area mounting devices, each of said mounting devices comprising first and second substantially rigid end members (30,31) and a substantially rigid, substantially inelastic intermediate member (32) immovably fixed to and rigidly extending between said first and second end members (30,31), said first and second end members being respectively immovably fixedly connected to one of said first and second platters such that movement of said platters relative to each other is substantially prevented in all directions in parallel with the planes of said first and second platters during operation of the record playing apparatus;
said small contact area mounting devices being spaced from each other and being unconnected with each other, and being distributed around peripheral portions of said confronting surface portions of said first and second platters for providing a plurality of isolated small contact, substantially rigid, support areas directly between said first and second platters and maintaining said confronting surfaces spaced from each other, the total of the cross sectional areas of said small contact area mounting devices being substantially less than the area of said platters in the plane of said platters, said first and second platters being connected with each other only via said small contact area mounting devices; and
a spindle in the central portion of said second platter for engaging a center of a phonograph record, said spindle not extending to said first platter.

15. Record playing apparatus according to claim 14 wherein said end members and intermediate member are integrally formed from a single piece of material.

16. Record playing apparatus according to claim 15 wherein said intermediate member is a reduced diameter portion between said end members.

17. A record playing apparatus comprising:
a substantially rigid base;
a motor driven turntable platter on said base;
a tone arm arrangement; and
a tone arm arrangement mounting structure, said mounting structure comprising:
a substantially rigid tone arm mounting plate-like member mounted to said base with no members substantially co-extensive with said plate-like member mounted therebetween, said substantially rigid plate-like member and said base having confronting surface portions;
a plurality of low compliance small contact area mounting devices, each of said mounting devices comprising first and second substantially rigid end members (30,31) and a substantially rigid, substantially inelastic intermediate member (32) immovably fixed to and rigidly extending between said first and second end members (30,31) said first and second end members being respectively immovably fixedly connected to one of said base and plate-like member such that movement of said base and plate-like member relative to each other is substantially prevented in all directions in parallel with the planes of said base and plate-like member during operation of the record playing apparatus;
said small contact area mounting devices being spaced from each other and being unconnected with each other, and being distributed around peripheral portions of said confronting surface portions of said base and plate-like member for providing a plurality of isolated small contact, substantially rigid, support areas directly between said base and plate-like member and maintaining said confronting surfaces spaced from each other, the total of the cross sectional areas of small contact area mounting devices being substantially less than the area of said confronting surfaces in the plane of said confronting surfaces, said base and plate-like members being connected with each other only via said small contact area mounting device.

18. Record playing apparatus according to claim 17 wherein said plate-like member is mounted from above said base, and further comprising:
  a second plate-like member having an upper surface portion which confronts a lower surface portion of said base; and
  a further plurality of said substantially rigid small contact area mounting devices distributed around peripheral portions of said confronting surface portions of said second plate-like member and base and providing a plurality of small contact support areas directly between said second plate-like member and base and maintaining said confronting surface portions of said second plate-like member and said base spaced from each other and substantialy preventing relative movement therebetween in all directions in parallel with the planes of said base and second plate-like member.

19. Record playing apparatus according to claim 17 wherein said end members and said intermediate member are integrally formed from a single piece of material.

20. Record playing apparatus according to claim 19 wherein said intermediate member is a turned down portion between said end members.

21. Record playing apparatus according to any one of claims 1, 4 or 5, comprising at least three of said small contact area mounting devices distributed substantially equally spaced from each other around said peripheral portions of said confronting surface portions of said platters.

22. Record playing apparatus according to claim 7, comprising at least three of said small contact area mounting devices distributed substantially equally spaced from each other around said peripheral portions of said confronting surface portions of said base and plate-like member.

23. Record playing apparatus according to claim 8, comprising at least three of said small contact area mounting devices distributed substantially equally spaced from each other around said peripheral portions of said confronting surface portions of said base and second plate-like member.

24. Record playing apparatus according to any one of claims 14, 15 or 16, comprising at least three of said small contact area mounting devices distributed substantially equally spaced from each other around said peripheral portions of said confronting surface portions of said platters.

25. Record playing apparatus according to claim 17, comprising at least three of said small contact area mounting devices distributed substantially equally spaced from each other around said peripheral portions of said confronting surface portions of said base and plate-like member.

26. Record playing apparatus according to claim 18, comprising at least three of said small contact area mounting devices distributed substantially equally spaced from each other around said peripheral portions of said confronting surface portions of said base and second plate-like member.

27. Record playing apparatus according to any one of claims 14, 15, or 16 wherein said intermediate member is a rod-like member.

28. Record playing apparatus according to any one of claims 17, 18, or 54.

29. A record playing apparatus comprising:
  a first motor driven, substantially rigid, turntable platter,
  a second substantially rigid turntable platter mounted above said motor driven platter with no further platters mounted therebetween, said first and second platters having confronting surface portions, said second platter adapted to receive a record thereon;
  a plurality of low compliance small contact area mounting devices, each of said mounting devices comprising a substantially rigid, substantially inelastic protrusion or projection immovably fixed to and rigidly extending from one of said first and second platters toward the other of said platters and each protrusion or projection having a free end portion of given shape;
  receiving means on said other of said platters, said receiving means comprising at least one depression for receiving and contacting said free end portions of said small contact area mounting devices at given positions on said free end portions such that movement of said other platter relative to said free end portions of said small contact area mounting devices is substantially prevented in all directions in parallel with the planes of said platters during operation of the record playing apparatus;
  said small contact area mounting devices being spaced from each other and being unconnected with each other, and being distributed around peripheral portions of said confronting surface portions of said first and second platters for providing a plurality of isolated small contact, substantially rigid, support areas directly between said first and second platters and maintaining said confronting surfaces spaced from each other, the total of the cross sectional areas of said small contact area mounting devices being substantially less than the area of said platters in the plane of said platters, said first and second platters being connected with each other only via said small contact area mounting devices; and
  a spindle in the central portion of said second platter for engaging a center of a phonograph record, said spindle not extending to said first platter.

30. Record playing apparatus according to claim 29, wherein said at least one depression has a generally V-shaped cross section.

31. Record playing apparatus according to claim 29, wherein said protrusions or projections extend downwardly from said second platter and said first platter has said receiving means for receiving said protrusions or projections.

32. Record playing apparatus according to claim 29, wherein said receiving means comprises at least one groove fro receiving and contacting the free ends of said protrusions or projections.

33. Record playing apparatus according to claim 29, wherein said receiving means comprises a plurality of receptacles distributed around said other platter for receiving and contacting the free ends of said protrusions or projections.

34. Record playing apparatus according to claim 29, wherein said small contact area mounting devices each comprises an elongated, rigid, generally rod-shaped member extending between said confronting surfaces of said first and second platters.

35. A record playing apparatus comprising:
  a substantially rigid base;

a motor driven turntable platter on said base;

a tone arm arrangement; and a tone arm arrangement mounting structure, said mounting structure comprising:

a substantially rigid tone arm mounting plate-like member mounted to said base with no members substantially co-extensive with said plate-like member mounted therebetween, said substantially rigid plate-like member and said base having confronting surface portions;

a plurality of low compliance small contact area mounting devices, each of said mounting devices comprising a substantially rigid, substantially inelastic protrusion or projection immovably fixed to and rigidly extending from one of said base and plate-like member toward the other of said base and plate-like member, each protrusion or projection having a free end portion of given shape; and receiving means on said other of said base and plate-like member, said receiving means comprising at least one depression for receiving and contacting said free end portions of said small contact area mounting devices at given positions on said free end portions such that movement of said other of said base and plate-like member relative to said free end portions of said small contact area mounting devices is substantially prevented in all directions in parallel with the planes of said base and plate-like member during operation of the record playing apparatus;

said small contact area mounting devices being spaced from each other and being unconnected with each other, and being distributed around peripheral portions of said confronting surface portions of said base and plate-like member for providing a plurality of isolated small contact, substantially rigid, support areas directly between said base and plate-like member and maintaining said confronting surfaces spaed from each other, the total of the cross sectional areas of said small contact area mounting devices being substantially less than the area of said confronting surfaces in the plane of said confronting surfaces, said base and plate-like members being connected with each other only via said small contact area mounting devices.

36. Record playing apparatus according to claim 29, wherein said plate-like member is mounted above said base, and further comprising:

a second plate-like member having an upper surface portion which confronts a lower surface portion of said base; and a further plurality of said substantially rigid small contact area mounting devices and at least one associated receiving means distributed around peripheral portions of said confronting surface portions of said plate-like member and base and providing a plurality of said small contact support areas directly between said second plate-like member and for maintaining said confronting surface portions of said second plate-like member and said base spaced from each other and substantially preventing relative movement between said second plate-like member and said free end portions of said small contact area mounting devices which contact said second plate-like member.

37. Record playing apparatus according to claims 35 and 36 wherein said at least one depression has a generally V-shaped cross section.

38. Record playing apparatus according to claims 35 or 36 wherein said protrusions or projections extend from a plate-like member, and wherein said base comprises said receiving means thereon.

39. Record playing apparatus according to claims 35 or 36 wherein said receiving means comprises at least one groove for receiving and contacting the free ends of said protrusions or projections.

40. Record playing apparatus according to claims 35 or 36 wherein said receiving means comprises a plurality of receptacles distributed around said other of said confronting surfaces for receiving and contacting the free ends of said protrusions or projections.

41. Record playing apparatus according to claims 35 or 36 wherein said small contact area mounting devices each comprises an elongated, rigid, generally rod-shaped member extending between said associated confronting surfaces.

42. Record playing apparatus according to any one of claims 29, 32 or 33, comprising at least three of said small contact area mounting devices distributed substantially equally spaced from each other around said peripheral portions of said confronting surface portions of said platters.

43. Record playing apparatus according to claim 35, comprising at least three of said small contact area mounting devices distributed substantially equally spaced from each other around said peripheral portions of said confronting surface portions of said base and plate-like member.

44. Record playing apparatus according to claim 36, comprising at least three of said small contact area mounting devices distributed substantially equally spaced from each other around said peripheral portions of said confronting surface portions of said base and second plate-like member.

* * * * *

UNITED STATES PATENT AND TRADEMARK OFFICE
CERTIFICATE OF CORRECTION

PATENT NO. : 4,389,718

DATED : June 21, 1983

INVENTOR(S) : Frank RIZZELLO

It is certified that error appears in the above-identified patent and that said Letters Patent is hereby corrected as shown below:

COLUMN 11 (Claim 28), line 64, change "17, 18 or 54"

to --17, 18, 19 or 20--.

Signed and Sealed this

Twenty-ninth Day of October 1985

[SEAL]

Attest:

DONALD J. QUIGG

Attesting Officer

Commissioner of Patents and Trademarks—Designate